(12) United States Patent
Roe et al.

(10) Patent No.: US 8,362,631 B2
(45) Date of Patent: Jan. 29, 2013

(54) MARINE ENERGY HYBRID

(76) Inventors: Justin C. Roe, Kalamazoo, MI (US); Michael H. Yount, Tempe, AZ (US)

( * ) Notice: Subject to any disclaimer, the term of this patent is extended or adjusted under 35 U.S.C. 154(b) by 0 days.

(21) Appl. No.: 13/465,483

(22) Filed: May 7, 2012

(65) Prior Publication Data

US 2012/0211987 A1 Aug. 23, 2012

Related U.S. Application Data

(63) Continuation of application No. 11/775,692, filed on Jul. 10, 2007, now Pat. No. 8,174,135.

(60) Provisional application No. 60/828,957, filed on Oct. 10, 2006, provisional application No. 60/806,836, filed on Jul. 10, 2006.

(51) Int. Cl.
*F03B 13/12* (2006.01)

(52) U.S. Cl. .................. 290/43; 290/54; 290/44; 290/55

(58) Field of Classification Search ............... 290/43, 290/44, 54, 55; 415/3.1, 210.1
See application file for complete search history.

(56) References Cited

U.S. PATENT DOCUMENTS

| | | | |
|---|---|---|---|
| 4,114,046 A | 9/1978 | Yousef | |
| 4,832,569 A | 5/1989 | Samuelsen et al. | |
| 6,100,600 A | 8/2000 | Pflanz | |
| 6,294,844 B1* | 9/2001 | Lagerwey | 290/55 |
| 6,476,511 B1 | 11/2002 | Yemm et al. | |
| 6,726,439 B2 | 4/2004 | Mikhail et al. | |
| 6,766,643 B2 | 7/2004 | Christensen | |
| 6,902,370 B2 | 6/2005 | Dawson et al. | |
| 6,967,413 B2 | 11/2005 | Atiya | |
| 7,071,578 B1 | 7/2006 | Shibata et al. | |
| 7,075,191 B2 | 7/2006 | Davison | |
| 7,323,792 B2 | 1/2008 | Sohn | |
| 7,329,961 B2* | 2/2008 | Marchetti | 290/54 |
| 7,331,762 B2 | 2/2008 | Fraenkel | |
| 7,397,144 B1* | 7/2008 | Brostmeyer et al. | 290/53 |
| 7,566,983 B1* | 7/2009 | Lyatkher | 290/54 |
| 7,633,177 B2* | 12/2009 | Platt | 290/54 |
| 7,750,492 B1* | 7/2010 | Ryznic et al. | 290/54 |
| 7,893,556 B1* | 2/2011 | Ryznic et al. | 290/55 |
| 2006/0232075 A1* | 10/2006 | Fraenkel | 290/54 |

FOREIGN PATENT DOCUMENTS

| | | |
|---|---|---|
| DE | 10064472 | 6/2002 |
| JP | 2006-010822 | 1/1994 |
| JP | 6200516 | 7/1994 |
| JP | 2005-120959 | 5/2005 |
| WO | WO03/016714 | 2/2003 |

* cited by examiner

*Primary Examiner* — Quyen Leung
*Assistant Examiner* — Naishadh Desai
(74) *Attorney, Agent, or Firm* — Gardner, Linn, Burkhart & Flory, LLP

(57) ABSTRACT

A marine energy hybrid includes a support structure locatable at or near the surface of a body of water and at least two of (a) a hubless upper carriage movable along an upper track of the support structure with at least one wind vane mounted at the upper carriage to induce motion of the upper carriage relative to the support structure by reaction with the wind stream, (b) a hubless lower carriage movable along a lower track of the support structure with at least one water vane mounted at the lower carriage to induce motion of the lower carriage relative to the support structure by reaction with the water current, and (c) at least one wave energy conversion device integral with the support structure and operable to generate electrical or mechanical power in response to wave motion of the body of water.

27 Claims, 8 Drawing Sheets

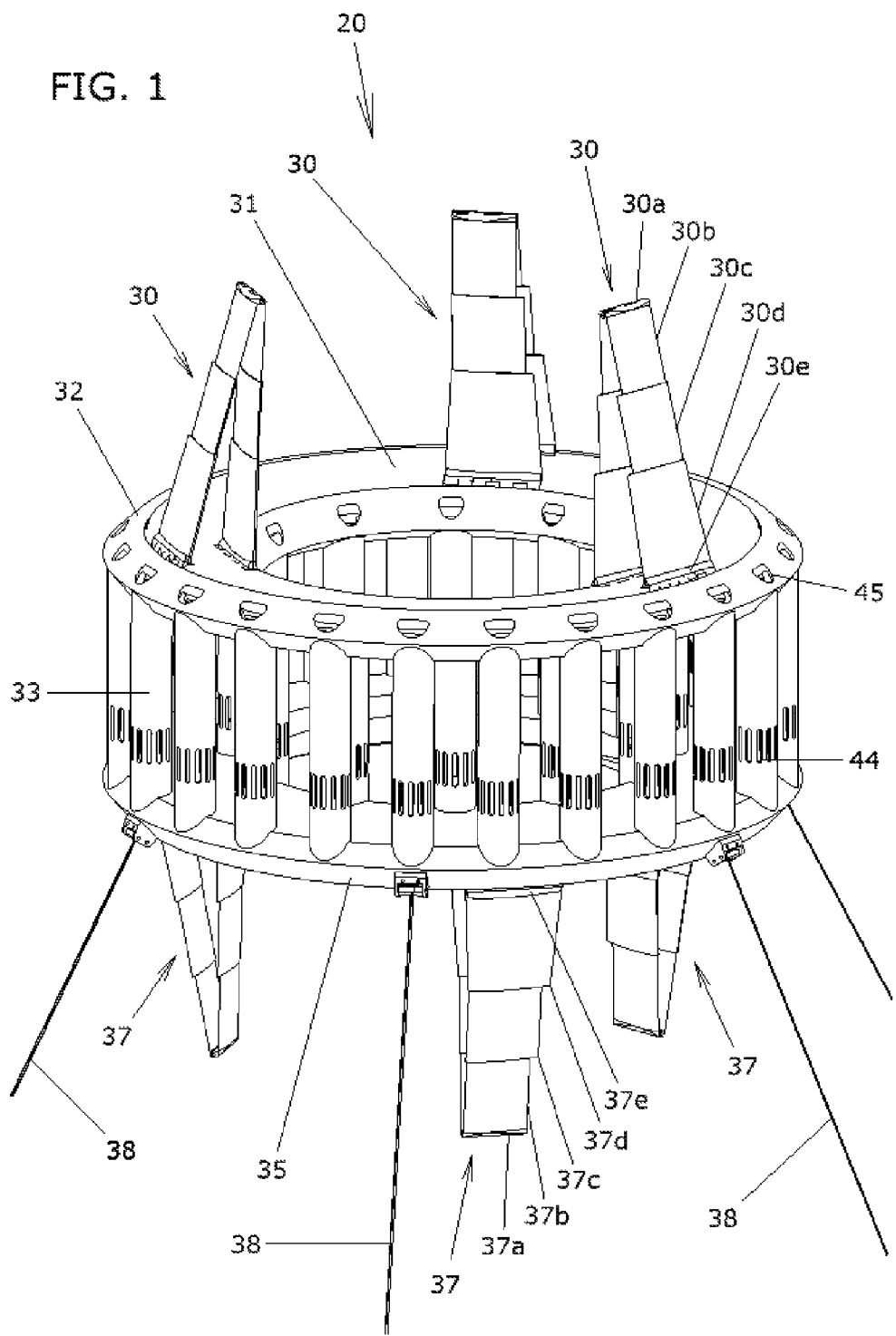

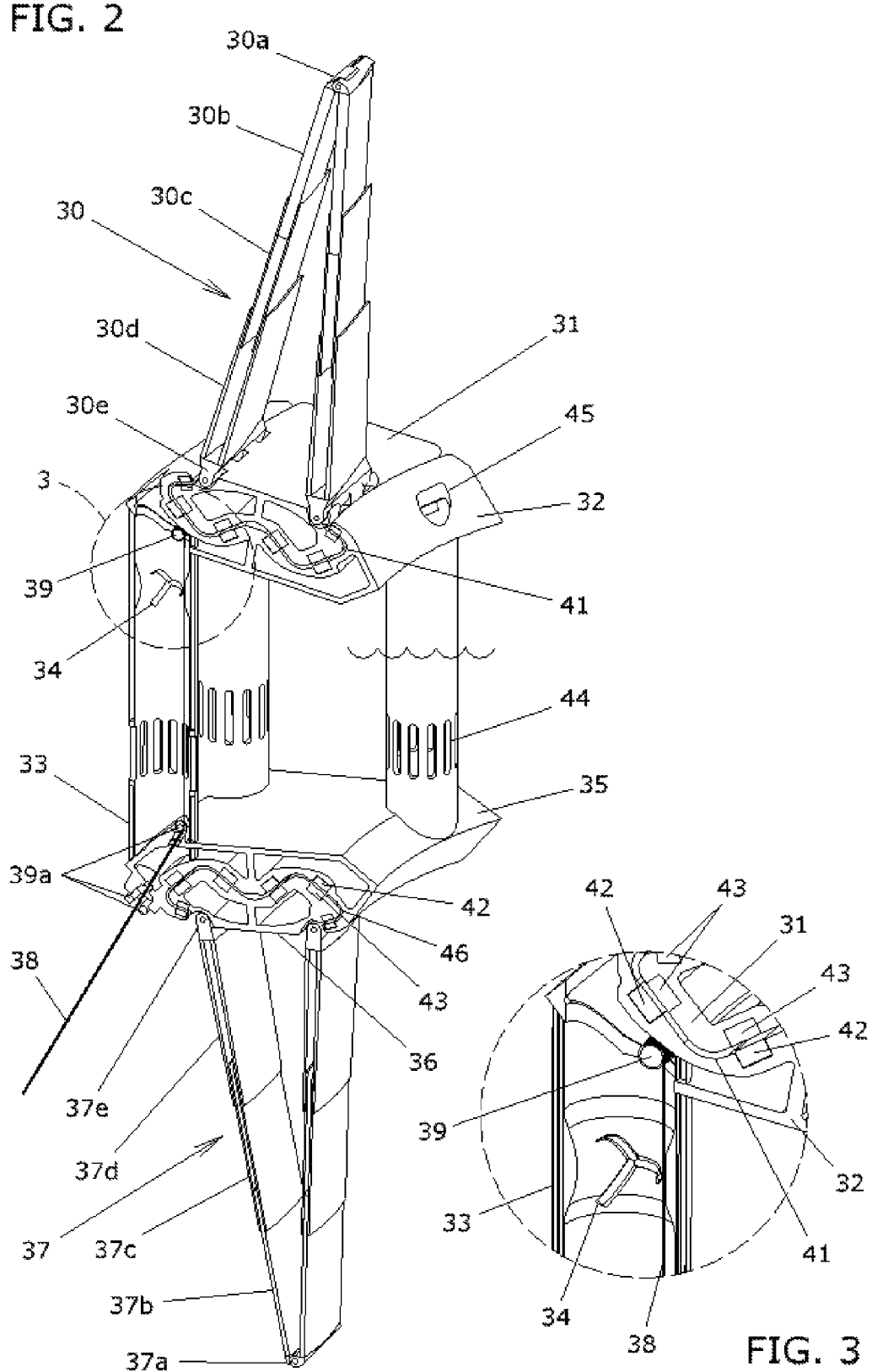

FIG. 6
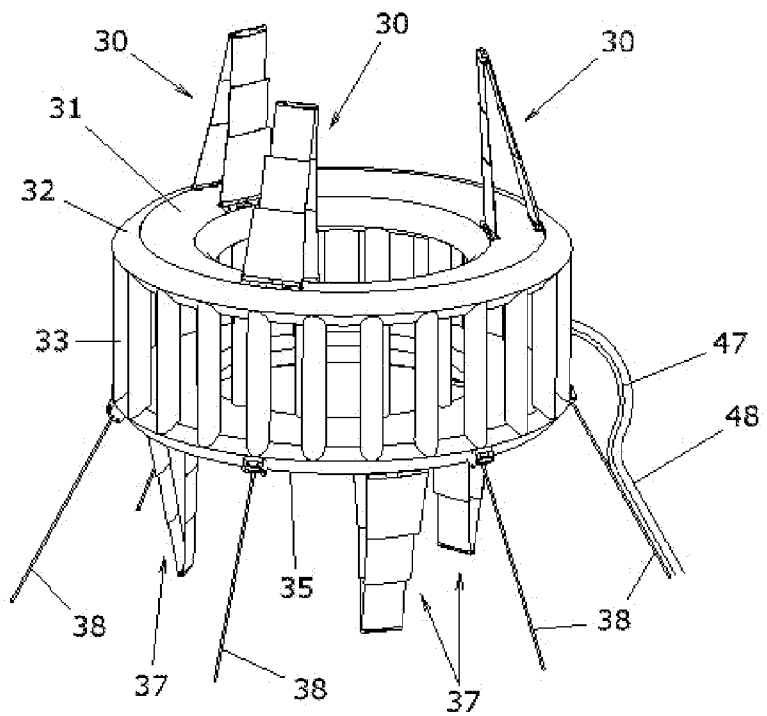
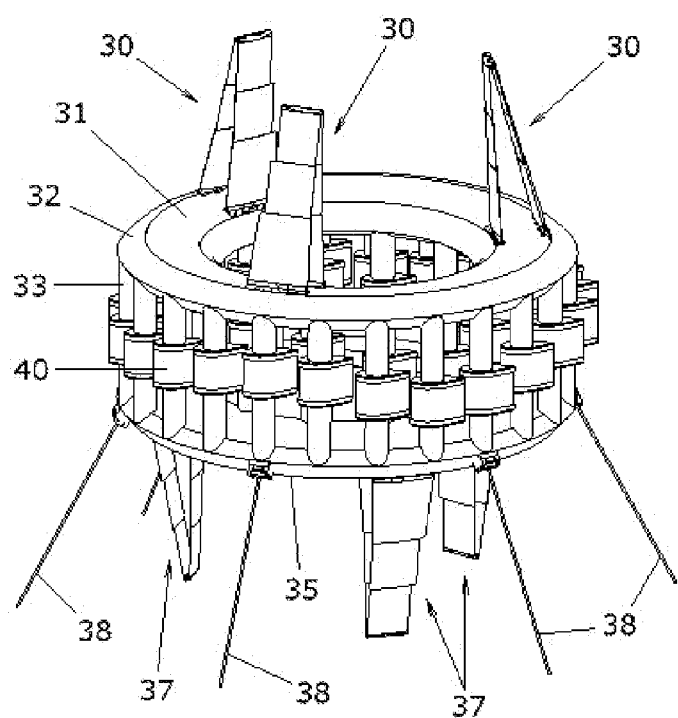
FIG. 7

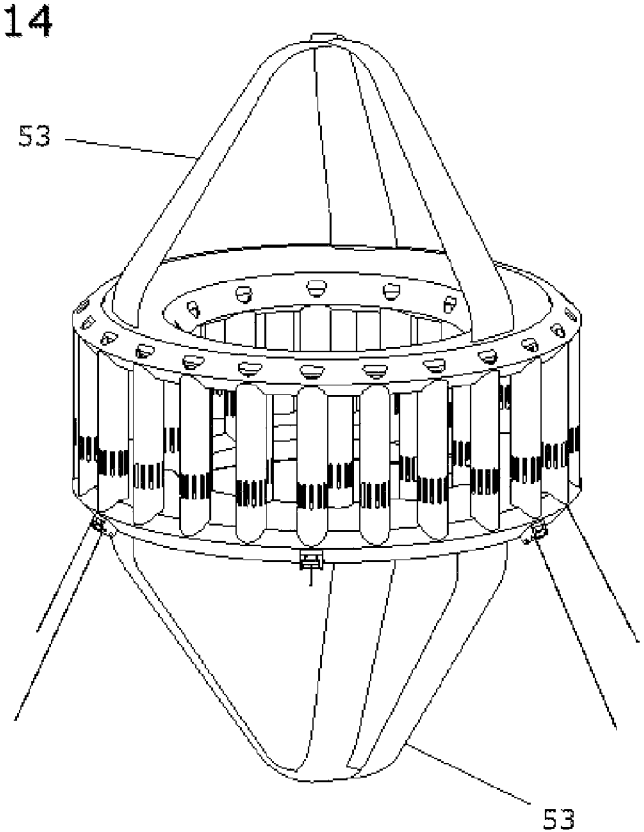
FIG. 14
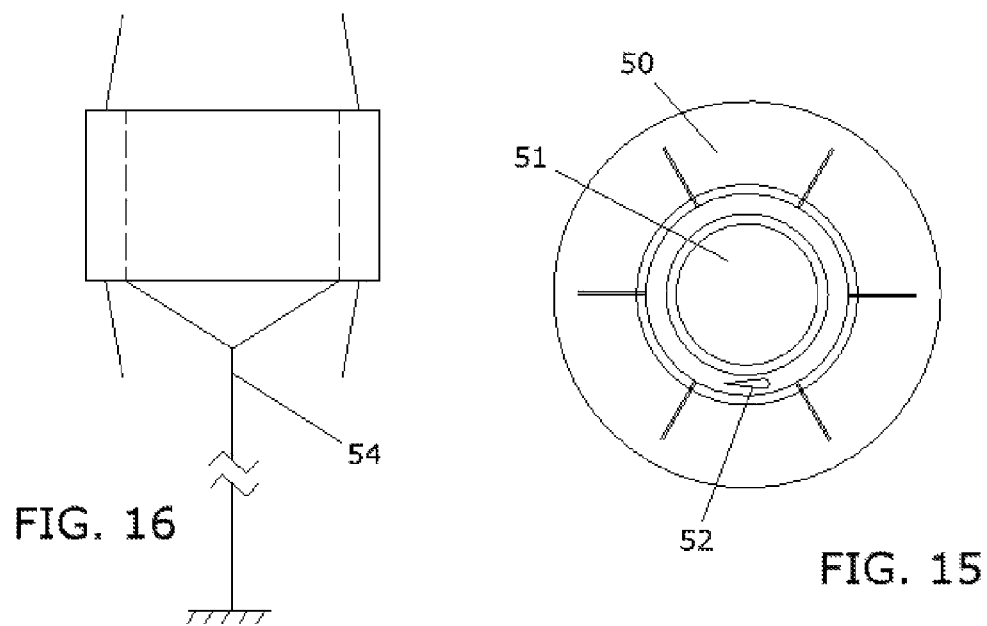
FIG. 16
FIG. 15

FIG. 17
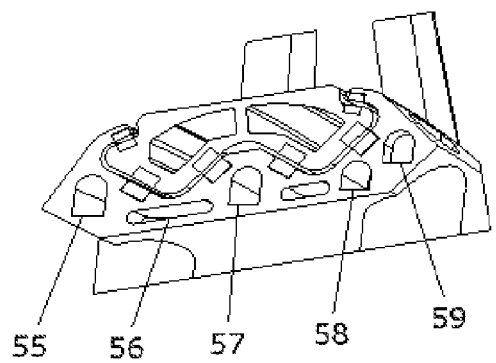
FIG. 18
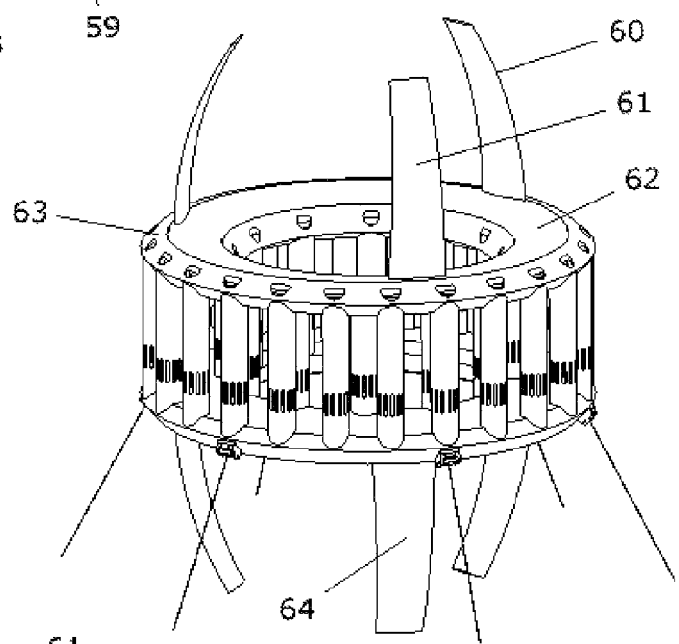
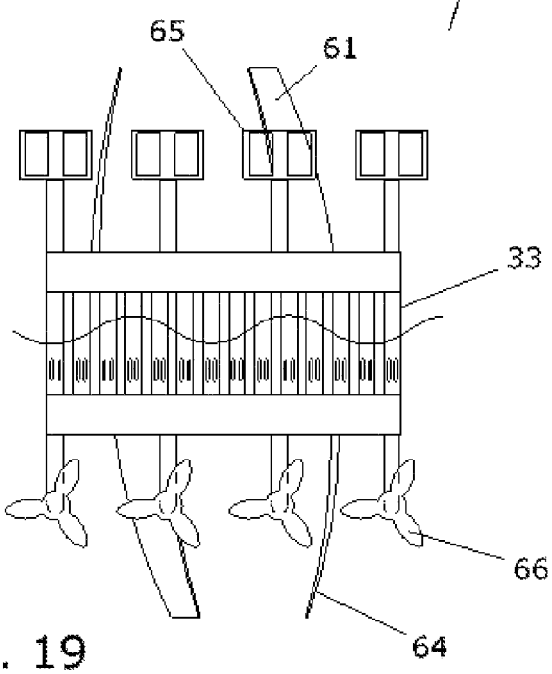
FIG. 19

MARINE ENERGY HYBRID

CROSS-REFERENCE TO RELATED APPLICATIONS

This application is a continuation of U.S. patent application Ser. No. 11/775,692, filed Jul. 10, 2007, now U.S. Pat. No. 8,174,135, which claims the benefit of U.S. provisional patent application Ser. No. 60/806,836 filed Jul. 10, 2006, and Ser. No. 60/828,957 filed Oct. 10, 2006, which are hereby incorporated herein by reference in their entireties.

FIELD OF INVENTION

The present invention relates to wind, wave and ocean current energy systems and in particular to synergistic hybrids thereof.

BACKGROUND OF THE INVENTION

As the quest for clean, abundant and secure energy supply intensifies, attention is being increasingly directed to marine sources such as wind, waves and ocean currents. Each of these resources is a concentrated kinetic form of solar energy capable of providing a significant share of global human demand. A multitude of technologies has emerged to harness and convert these powerful forces. Every technical proposal is subject to the same realities, namely that to be economically viable, its physical structure must capture the maximum possible energy with the lowest possible materials cost and over the greatest possible lifespan. Additionally, the frequency and expense of maintenance must be minimized. In the harsh marine environment, each of these factors presents a particularly acute challenge.

The most mature technology presently deployed offshore is that of wind turbines. Locating offshore is advantageous for two main reasons. First, the wind speed over water is less impeded by surface friction and obstacle-induced turbulence than it is on land, allowing substantially higher energy potential. Second, land-based wind farms are limited by available land area, and elicit considerable social resistance due to perceived "visual blighting" of the landscape. Unfortunately, these offshore wind installations have encountered substantial obstacles. Though visual pollution is less of an issue, because of the required minimum inter-turbine spacing, very large areas of towers still fill the horizon. There are physical issues, as well. Due to the economically-driven trend towards extremely large blade rotor diameters, and the resultant concentrated stresses at the blade roots, hub and gear mechanisms, component failures requiring expensive overhaul are common. This high rate of wear also directly affects turbine lifespan which is currently projected to be approximately 20 years. A further consequence of these stress loads is that conventional wind turbines are approaching the upper limits of unit size, which increases the footprint area of the wind farm for any given output.

There exist two major types of wind turbine: Those whose blades radiate from a hub on a horizontal shaft, (Horizontal Axis Wind Turbines, or HAWTs), and those with a vertical axis of blade rotation, (Vertical Axis Wind Turbine, or VAWTs). The present invention relates to an interpretation of the VAWT type of machine. At present, there are several known structures with a number of vertical vanes supported by a system of horizontal spokes radiating from a hub which is supported on top of a bearing structure, and which hub, in turn, transfers a torque from the vanes to a vertical shaft. The drawbacks to this configuration are twofold. First, the horizontal spokes serve no constructive aerodynamic purpose; in fact, they contribute only parasitic drag, which limits turbine efficiency. Additionally, as the diameter of the turbine increases, the mass of said horizontal spokes increases in a non-linear fashion, further limiting turbine efficiency, and ultimately structurally limiting the overall diameter and output of the turbine. Second, supporting the turbine assembly on a central hub concentrates load forces over a small bearing surface, which causes significant wear, and consequently reduces system lifespan.

Various VAWT designs have been proposed that eliminate the horizontal support spokes and central hub, instead mounting the wind-propelled vanes on some form of peripheral bearing structure. The greatest significance of the hubless VAWT design is that the area presented to the wind, and the subsequent power output is no longer restricted by the physical limits of blade length as it is with HAWTs, or by the aerodynamic drag and mass of the horizontal spoke arrangement of conventional VAWTs. Consequently, the theoretical scale of the hubless VAWT is virtually unlimited. It should be noted, however, that in practical terms the cost of an offshore floating hubless VAWT may be prohibitively great. In this context, the advantage of symbiotically integrating the architecture of wave and ocean current energy systems with this class of VAWT, thereby sharing costs, is compelling.

Another unavoidable aspect of offshore wind farms common to all marine-based systems is the necessity for power transmission back to land. High voltage submarine electricity cables or Hydrogen gas pipelines represent a significant capital cost which directly affects profitability. Because the output of an individual conventional wind turbine is relatively small, the energy transmission network linking multiple units is complex and extensive, resulting in substantial costs and environmental impact. Conversely, the larger the output of an individual turbine, or hybrid, the simpler the transmission network becomes, reducing costs and environmental disruption.

A controversial, but nonetheless valid environmental concern is that of bird kill. At issue is the fact that although they are rotating at only 13.4 rpm, and although the blade roots are clearly visible, the slender blade tips of a 100 m diameter HAWT rotor travel at 252 Km/h, inhibiting blade visibility at the outer region of the swept area, and increasing the likelihood of collision. By contrast, both the blade roots and tips of a large-diameter VAWT move at the same low rotational speed, enhancing overall visibility and decreasing the likelihood of collision.

The major drawback to wind farms is their unpredictable intermittency. Unlike wave conditions, which can be forecast days in advance, and ocean current flows which are inherently stable and reliable, wind conditions can fluctuate radically within hours. The practical consequence of this is that backup fossil fuel power plants with capacity equivalent to that of the wind farm, must be maintained in anticipation of a sudden drop in wind energy output. By forming a hybrid of diverse marine energy sources, there is less fluctuation in output, requiring less supplemental fossil-derived backup.

The second major contender for marine energy production is wave power. Despite a multitude of proposed designs over the past 200 years, practical development has been stymied by the emergence and exploitation of cheap, relatively convenient fossil fuels. As with all renewable energy sources, wave power is for the first time enjoying the research and investment required for commercialization. Because wave energy is more densely concentrated than wind energy, the potential exists to generate the equivalent output of a wind farm whilst occupying less than a quarter of the surface area.

There are two major types of wave energy converters (WECs), "point source", and "attenuators". Point source WECs extract energy from a relatively small unit of surface area per device, whereas attenuators generally span several wave crests concurrently, and occupy a greater area per device. The present invention may be configured to integrate either the point source, or attenuator-type of WEC, or a combination thereof, into the primary structure, but may also serve as a mooring facility for a diversity of different type WECs. In fact, a circumferentially-located attenuator-type WEC, particularly if composed of a soft, pneumatic structure could serve as a protective barrier surrounding the present invention. The most common point source WEC is known as an "oscillating wafer column". In this design, the rise and fall in water pressure of waves is used to alternately push and pull a column of air within some form of duct, ultimately driving a pneumatic turbine.

Despite the promise of wave energy converters, the vast majority of existing designs share a common set of drawbacks that negatively affect capital and operational costs. First, almost without exception, WECs are very material intensive. The major reason for this is the necessity for "reactive mass", namely a physical mass equal to the wave mass which is reacting against it. A secondary reason for heavy construction is survivability in high seas. The cost of WEC structural mass can account for as much as 80% of capital cost. Another disadvantage of present designs is they tend to consist of fields of multiple units, similar to wind farms. Consequently, large areas are occupied, mooring and power transmission networks are extensive, shipping navigation is impeded, and maintenance of individual units at sea involves high risk and expense. Another tendency of WEC designs is that towards complexity of mechanical-to-electrical conversion. Many proposals involve stress-prone linkages and hydraulic circuits. As a result, system lifespan is usually projected to be less than 20 years.

The third marine energy source under consideration is ocean current, both tidal and deep sea. The overwhelming advantage of marine current flow is its reliability and predictability. Unlike wind or wave regimes, steady-state ocean currents such as the United States' Gulf Stream and Japan's Kuroshio can produce clean power as reliably as fossil fueled plants. This concept is defined as capacity factor (CF), which is a function of actual system output over time relative to 100% of theoretical potential output over the same period. Nuclear power plants are capable of a 90% CF, and coal-fired plants typically run at 70% CF. By comparison, offshore wind farms and wave farms each appear capable of a CF of 45%. In this context, the significance of an ocean current power plant achieving a CF of 90%+ is apparent. Another benefit of water turbines is that because at sea level, water is 784 times denser than air, a water-driven turbine is substantially smaller for an equivalent power output.

The fundamental objective that ocean current turbines share with wind turbines, is that a maximum area of flow should be intercepted utilizing the minimum material investment. The identical rationale for the hubless vertical axis wind turbine (VAWT) above water can be applied to its submarine ocean current counterpart.

Ocean current converters share some of the limitations common to wind and wave devices. These include a reliance on large areas of deployment necessitating extensive mooring and transmission networks, and high risk, expensive maintenance of individual units. In addition, ocean current poses some unique design challenges. Among these is the biofouling of slender hydrofoils which reduces efficiency and increases maintenance costs. Another concern is the threat of these hydrofoils to large marine mammals. Finally, system life spans are not likely to exceed the present twenty year projections for either wind or wave based schemes.

SUMMARY OF THE INVENTION

It is an object of the present invention to provide a marine energy hybrid more powerful per unit of area than any individual marine-based technology.

A further object of the present invention is to provide a marine energy hybrid that produces energy more reliably than any individual marine-based technology.

Another object of the present invention is to provide a marine energy hybrid with a radically extended lifespan than that of existing technologies by distributing load forces over a larger area, reducing wear, and eliminating failure-prone components such as generator gearboxes.

Yet another object of the present invention is to provide lower capital, installation, and maintenance costs compared with those of wind, wave, and marine current systems individually by leveraging the use of a common platform.

Still another object of the present invention is to provide a marine energy hybrid with lower environmental, navigational, and visual impact than that of competing technologies individually.

It is the aim of the present invention to synergistically combine a diversify of marine energy producing elements in such a fashion that the resulting hybrid outperforms any of said elements individually. Accordingly, the desired outcome is to increase power output from the same surface area, more reliably, at lower cost, and with reduced environmental impact.

According to an aspect of the present invention, a marine energy hybrid includes a support structure locatable on the surface of a body of water. The marine energy hybrid further includes at least two of (a) an upper bearing-supported rotatable hubless carriage movable along an upper track of the support structure, and at least one wind vane mounted at the upper rotatable carriage, with the wind vane being configured to induce motion of the upper rotatable carriage relative to the support structure by reaction with the wind stream, (b) a lower bearing-supported rotatable hubless carriage movable along a lower track of the support structure, and at least one water vane mounted at the lower rotatable carriage, with the water vane being configured to induce motion of the lower rotatable carriage relative to the support structure by reaction with the water current, and (c) at least one wave energy conversion device integral with the support structure and operable to generate energy, such as electrical or mechanical power, in response to wave motion of the body of water. The marine energy hybrid further includes at least one energy conversion device operable to convert the motion of the carriage or carriages relative to the support structure into usable energy.

Thus, the marine energy hybrid may include upper and lower carriages and wind and water vanes for generating energy via movement of the vanes and carriages in response to wind and water currents, or the marine energy hybrid of the present invention may include an upper carriage and wind vanes and a wave energy conversion device, or the marine energy hybrid of the present invention may include a lower carriage and water vanes and a wave energy conversion device. Optionally, the marine energy hybrid of the present invention may include all three motion/energy generating devices or elements, depending on the particular application of the device and/or the targeted environment in which it is to be deployed.

These and other objects, advantages, purposes and features of the present invention will become apparent upon review of the following specification in conjunction with the drawings.

BRIEF DESCRIPTION OF THE DRAWINGS

FIG. 1 is a perspective view of the marine energy hybrid of the present invention configured to capture wind, wave, and ocean current energy.

FIG. 2 is a cross-section perspective view of the marine energy hybrid of the present invention configured to capture wind, wave, and ocean current energy.

FIG. 3 is a cross-section detail view of the marine energy hybrid assembly of the present invention.

FIG. 6 is a perspective view of the current invention configured to capture wind and ocean current energy only.

FIG. 7 is a perspective view of an alternate embodiment of the marine energy hybrid of the present invention wherein the wave energy converter is an oscillating float-type mechanism located on the exterior of each column.

FIG. 14 is a side view of the present invention wherein the vane assembly comprises multiple vanes mounted to a common rotatable carriage and sharing a common apex.

FIG. 15 is a plan view of an alternate embodiment of the present invention wherein the entire area circumscribed by the primary structure is occupied by wave energy converters and/or a field of wave energy converters extends outside the circumscribed area.

FIG. 16 is a side view of an alternate embodiment of the present invention illustrating a tether configuration converging at the central axis into a single tether.

FIG. 17 is a cross section view of the present invention illustrating the location of various infernal utilities.

FIG. 18 is a perspective view of an alternate embodiment of the present invention wherein the vane members are single, non-telescoping, as opposed to multi-vane, telescoping assemblies.

FIG. 19 is a side view depicting the mounting of auxiliary conventional turbines above and below the waterline.

DETAILED DESCRIPTION OF THE PREFERRED EMBODIMENTS

Figure 4:
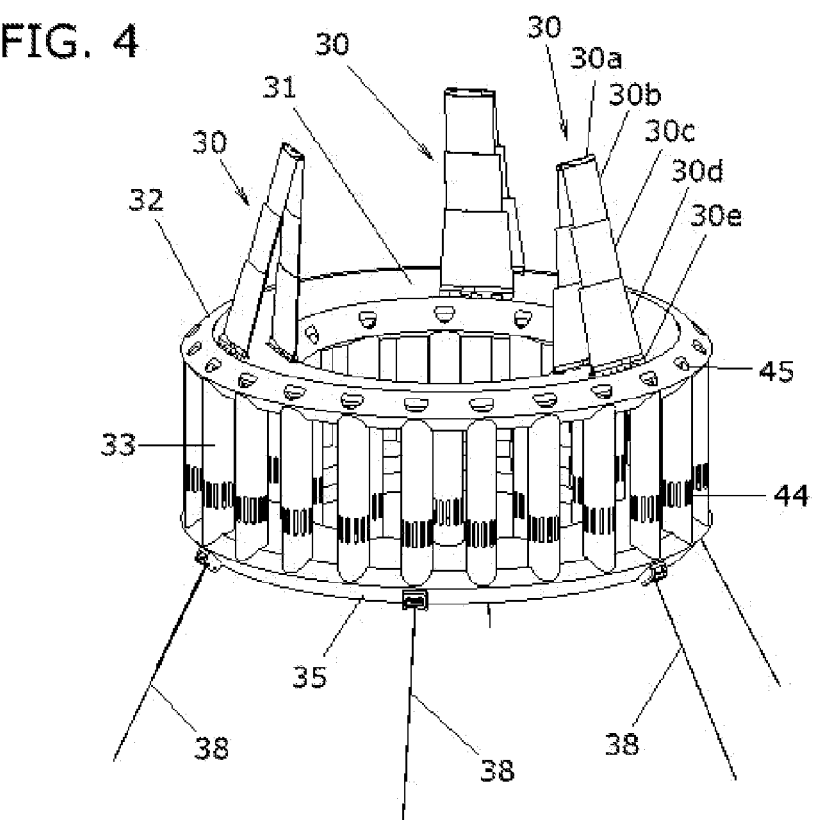
FIG. 4 is a perspective view of the marine energy hybrid of the present invention configured to capture wind and wave energy only.

The presently preferred embodiment of the invention will be best understood by reference to the drawings, wherein like parts are designated with like numerals throughout.

With reference to FIGS. 1, 2 and 3, a marine energy hybrid device or system 20 of the present invention is illustrated. Marine energy hybrid device 20 includes a central, non-rotatable or fixed member or ring 32 with an upper rotatable carriage element 31 rotatably mounted at an upper track assembly 41 of fixed member 32 and a lower rotatable carriage element 36 rotatably mounted at a lower track assembly 46 of a lower fixed member or ring 35. At least one vane assembly 30 is mounted to and extends upwardly from upper carriage element 31 for rotating upper carriage element 31 relative to fixed member 32 in response to the wind stream, while at least one vane assembly 37 is mounted to and extends downwardly from the lower carriage element 36 for rotating lower carriage element 36 relative to fixed member 32 in response to water currents, as discussed below. Marine energy hybrid device 20 also includes a plurality of rigid columns 33 interconnected between upper member 32 and lower member 35 and spaced radially from a central axis of the members or rings 32 and 35, and are operable to generate electricity or mechanical power in response to wave action, as also discussed below. A wave energy-propelled pneumatic turbine 34 is housed within each column 33. In one preferred embodiment the wave energy converter is an "oscillating water column" type device.

Each column 33 is connected to a rigid structural member 32 at its upper end, and to a rigid structural member 35 at its lower end. Housed within said structural elements 32 and 35 are track assemblies 41 and 46 respectively. Contained within the upper track assembly 41, is a rotatable carriage element 31 for rotation relative to the upper track assembly in response to the wind stream, as discussed below. Supported within the lower track assembly 46, is a rotatable carriage 36 that rotates relative to the lower track assembly in response to water currents, as also discussed below. The rotatable carriages may comprise bearing supported carriages that are movable along the respective track assemblies in a substantially frictionless manner, whereby movement of the carriages relative to the track assemblies of the support structure may generate electrical power or energy. As can be seen in FIG. 2, the upper and lower carriages 31, 36 may be formed or shaped to be movably received within correspondingly formed track assemblies 41, 46, such that the carriages may move along the track assemblies while upward or downward movement of the carriages relative to the track assemblies may be limited or substantially precluded. In the preferred embodiment, the track assemblies 41 and 46 comprise a plurality of wire coils 42 which repels a plurality of magnets 43 affixed to the rotatable carriages 31 and 36. This magnetic levitation (maglev) provides a substantially frictionless bearing surface, maximizing the rotational efficiency of carriages 31 and 36, and minimizing wear. Most preferably, the specified maglev technology should be of the permanent magnet type, as opposed to the electromagnet type. Such a permanent magnet maglev requires no external power supply for operation, and therefore represents the most efficient maglev solution. Other substitutive or supplementary means of achieving a low friction bearing include, but are not limited to, a compressed air bearing and/or a plurality of wheels affixed to the carriages 31 and 36 and/or the tracks 41 and 46.

Mounted to the rotatable carriage 31 is at least one vane assembly 30 spaced radially from the rotation axis and extending generally upwardly from the rotatable carriage. Preferably, the apparatus includes a plurality of vanes or vane assemblies spaced apart around and along the upper carriage, such as spaced substantially equidistantly apart around the carriage, to assist in maintaining motion of the carriage relative to the support structure regardless of wind direction and/ or shifts in wind direction. In the preferred embodiment vane assembly 30 comprises a triangulated arrangement of two individual vanes substantially separated at their bases, and conjoined at their upper or distal end regions or tips. Furthermore, each vane assembly 30 may comprise a telescoping plurality of hollow sections 30b, c, and d, a hinge at its distal end region or apex 30a, and a hinge at the root or base of each individual vane 30e (for hingedly or pivotally mounting the vane to the carriage 31), thereby allowing for adjustment of the height and surface area of the vanes (although this description is provided with reference only the outer vane element of vane assembly 30, clearly the radially inward vane element is formed and mounted to the carriage in a similar manner and is joined to the apex 30a of the outer vane element via the upper or distal hinge). Optionally, the vanes may include a vane cleaning device or mechanism or solution dispenser, such as, for example, an integral "rotating brush" mechanism that scours the upper sections 30b and 30c of vane assembly 30, to clean the exterior surfaces of the vanes during telescopic extension and retraction of the vanes.

Mounted to the lower rotatable carriage 36 is at least one vane assembly 37 spaced radially from the rotation axis and extending generally downwardly from the rotatable carriage. Preferably, the apparatus includes a plurality of vanes or vane assemblies spaced apart around and along the lower carriage, such as spaced substantially equidistantly apart around the carriage, to assist in maintaining motion of the carriage relative to the support structure regardless of wafer current direction and/or shifts in current direction. In the preferred embodiment, vane assembly 37 comprises a triangulated arrangement of two individual vanes substantially separated at their bases and conjoined at their lower or distal end regions or tips. Additionally, each vane assembly 37 may comprise a telescoping plurality of hollow sections 37b, c and d, a hinge at its distal end or apex 37a, and a hinge 37e at the base or root of each individual vane (for hingedly or pivotally mounting the vane to the carriage 36), thereby allowing for adjustment of the degree of extension or height and surface area of the vane (although this description is provided with reference only the outer vane element of vane assembly 37, clearly the radially inward vane element is formed and mounted to the carriage in a similar manner and is joined to the apex 37a of the outer vane element via the upper or distal hinge). Optionally, the vanes may include a vane cleaning device or mechanism or solution dispenser, such as, for example, an integral anti-biofouling mechanism that scours vane assembly 37, to clean the exterior surfaces of the vanes during telescopic extension and retraction of the vanes.

The non-rotating primary structure of the present invention comprising the rigid structural members 32, and 35, and the interconnecting columns 33, may be constructed using materials and techniques common to the oil rig and ship-building industries. The most mature construction technology at present is that of steel fabrication. More preferably, a stressed-skin, foam core sandwich construction may be utilized. A super-abundant, inexpensive, recyclable core foam such as styrene polymer, or copolymers might be specified. Ultimately, non-oil-based, biodegradable, vegetable-derived foams may be used. The stressed-skin component would preferably be comprised of modern fibre-reinforced "flexible cement", or similar cementatious material. Alternate or complimentary sandwich skin materials might be wood or bamboo-derived veneer laminates encased within an outer ply of protective glass fibre. The optimal stressed-skin, foam core composite will be inexpensive, lightweight, water impermeable, non-corrodible, and impact resistant.

The physical composition of the vane assemblies 30 and 37, and their associated carriages 31 and 36 should most preferably be lightweight, durable, and non-corrodible. Optimally, stressed-skin, foam core sandwich construction should be used wherever possible. Appropriate sandwich skin materials include glass fibre, kevlar, and wood or bamboo-derived veneer laminates. The previously described telescoping vane assembly would most preferably be actuated by a hydraulic or pneumatic mechanism directly related to that of the telescopic boom crane. These cranes are extensively used in industry, and are a mature, simple, durable, and low maintenance technology.

The overall structure of the present invention is moored to the floor or bottom of a body of wafer by a plurality of radially located, adjustable length tethers 38. As featured in FIGS. 2 and 3, a dynamically adjustable winch drum 39 is connected to the upper terminus of each tether 38. In the illustrated embodiment, the winch drum is located at or near an upper region of the column 33 so as to be at or above or substantially above the waterline when the marine energy hybrid is set in the water. The winch drum is thus remote from the point at which the tether 38 enters the rigid structure 35 and column 33 by virtue of an arrangement of rollers 39a which allows for the redirection of the tether to guide the tether upward toward the winch drum 39.

The economics of renewable energy systems in general, and marine-based renewable energy systems in particular, favor large scale machines. The present invention facilitates this trend. In the embodiment illustrated in FIG. 1, for example, the vane assemblies 30 and 37 may each extend about 80 m from root to tip when fully extended, and the overall diameter of the machine may be about 200 m (although a multitude other sizes may be implemented without affecting the scope of the present invention). In the alternative embodiments depicted in FIG. 8 and FIG. 9, vane assemblies 30 and 37 may each measure about 100 m, and the overall diameter may be about 1000 m.

In operation, the present marine energy hybrid is located semi-submerged at the surface of a body of water. Optimally, the preferred embodiment requires that the body of water in which it is placed should be in a state of motion such as is the case with major wind-driven and tidal current streams With reference to FIGS. 2 and 3, the above-water, wind-propelled vane assemblies 30 react with the wind stream and generate a thrust component causing rotation of the carriage 31 to which they are mounted relative to the upper non-rotatable member 32. In the preferred embodiment, a plurality of magnets 43 affixed to the upper rotatable carriage 31 is repulsively levitated by a plurality of track-mounted wire coils 42 affixed to the non-rotatable, rigid structural member 32. Consequently, the rotatable carriage 31 is supported by a substantially frictionless bearing, thereby maximizing rotational efficiency. The relative motion between the rotatable carriage 31 and the non-rotatable upper track assembly 41 is exploited for energy production. Most preferably, the same components responsible for the levitation of the carriage, namely the carriage-mounted magnets 43, and the track-mounted coils 42, also serve as the means for generating electrical current. Alternatively, the power take off means may be mechanical as opposed to electromagnetic. Examples include but are not limited to hydraulic, pneumatic, or friction-based thermal systems. Similarly, the present invention can be configured for a multitude of energy output forms and applications. These include, but are not limited to, alternating current electricity, direct current electricity, any combination of AC and DC electricity, hydrogen production, and desalinization and/or the like.

Provided that wave energy conditions are favorable, the wave energy converter (WEC) integral with the columns 33 will be operational. With reference to FIGS. 2 and 3, the oscillating water column (OWC) type WEC of the preferred embodiment functions as follows; as the wave is intercepted by the column 33, water is forced under pressure through at least one port 44 located substantially below the waterline. Subsequently, the water level within the hollow column rises, causing a compression of the air also contained within the column. As the contained air is compressed, it is forced to flow upwards towards a vent 45 located at the upper end of column 33, and perforating the upper rigid structural member 32. The resulting upwards flow of positively pressurized air is intercepted en-route by a uni-directional Darrieus-type turbine 34. Said turbine reacts in the direction indicated with said pressurized air and converts the resulting motion into useable energy by means of a connected generator or other mechanical means. As the crest of the wave passes the column 33, the water level within the hollow column recedes as the water is induced to reverse its flow through the same submarine port(s) 44 through which it had entered. As the water level begins to recede, the positively pressurized air directly above it within the column is now subject to a negative pressure, causing a reversal in the direction of air flow over the uni-directional turbine 34. As the air pressure differential equalizes, atmospheric air is now drawn into the vent 45. As successive waves are intercepted by column 33, the above reciprocating positive/negative air pressure cycle continues to propel the uni-directional turbine 34.

With reference to FIGS. 2 and 3, the below-water, ocean current-propelled vane assemblies 37 react with the ocean current stream, and generate a thrust component causing rotation of the carriage 36, to which they are mounted, relative to the lower track assembly 46 of the lower non-rotatable member 35. Most preferably, said rotation should be opposite in direction to that of the upper rotatable carriage 31, such that the torque of each carriage is counteracted by that of the other. In the preferred embodiment, a plurality of magnets 43, affixed to the lower rotatable carriage 36 is repulsively levitated by a plurality of track-mounted wire coils 42 affixed to the non-rotatable, rigid structural member 35. Consequently, the rotatable carriage 36 is supported by a substantially frictionless bearing, maximizing rotational efficiency. The relative motion between the rotatable carriage 36 and the non-rotatable lower track assembly 46 is exploited for energy production. Most preferably, the same components responsible for the levitation of the carriage, namely the carriage-mounted magnets 43, and the track-mounted coils 42, also serve as the means for generating electrical current. Significantly, such an arrangement obviates the need for a gearbox, or other means of "stepping up" the velocity of the rotor component relative to the stator, as is the case with most low-rpm conventional HAWTs.

Figures 8, 9:
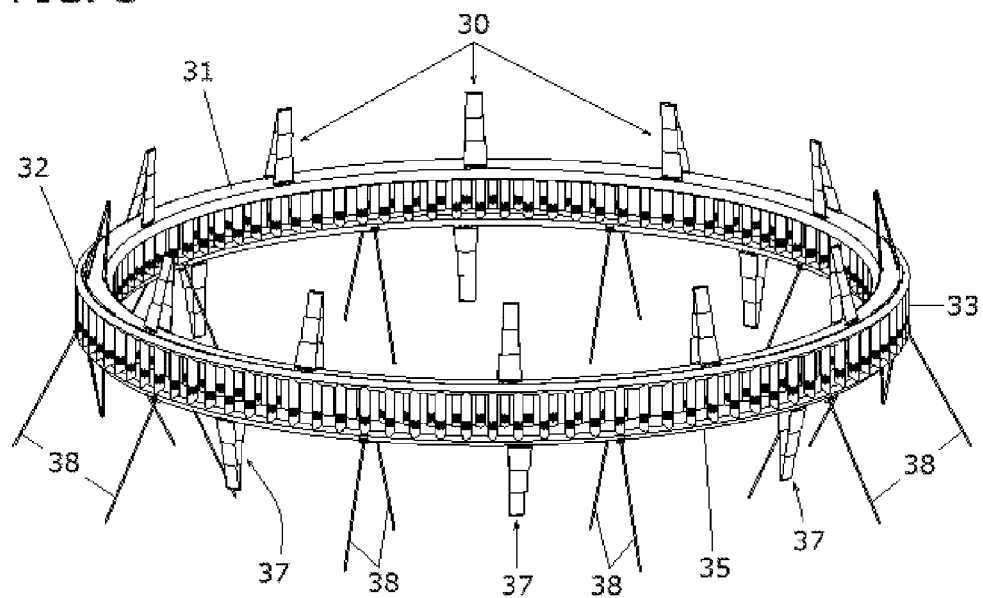
FIG. 8 is a perspective view of a large scale embodiment of the present invention with vane assemblies fully extended.
FIG. 9 is a perspective view of a large scale embodiment of the present invention with vane assemblies fully retracted.

As depicted in FIGS. 8 and 9, in a preferred embodiment, the vane assemblies 30 comprise a multitude of telescoping sections allowing adjustment of their degree of extension or height and surface area. Consequently, as wind speed increases, the vane assemblies 30 may be refracted with the primary aim of regulating both the stress loads encountered by said vane assemblies, and the power produced by the rotatable carriage to which they are mounted. The significance of this is twofold: first, a fully-extended vane assembly is able to generate maximal thrust in low wind conditions. Second, as wind speed increases to potentially destructive levels, the vane assemblies are able to protectively retract whilst continuing to produce a large volume of power. Such a feature provides enhanced performance of the energy hybrid device of the present invention as compared to existing wind turbines, which are induced to terminate production above a critical wind speed. Thus, because the available energy in wind increases in a non-linear fashion (twice the wind speed results in eight times the energy content), the present invention is able to exploit the highly lucrative storm energy power band that is typically untapped by conventional devices.

With reference to FIGS. 8 and 9, in one embodiment the wafer-propelled vane assemblies 37 are also able to telescopically extend and retract, such as in a similar manner as described above with respect to wind vane assemblies 30. This function is primarily applicable to tidal current applications, wherein the current flow velocity fluctuates widely between high and low tides. It is imperative that the stress loading encountered by the vane assemblies is maintained at sub-critical levels. Accordingly, during times of rapid current flow velocity, the vane assemblies 37 should be retracted. Conversely, during times of low current flow velocity, said vane assemblies should be extended.

A secondary purpose for telescopic vane assemblies is the control of biofouling. If is preferable that a means of scouring the upper sections of both above and below-water vanes be integrated into the telescoping assembly. For example, a brush or other cleaning mechanism or dispenser or the like may be integrated into the telescoping assembly to clean the outer surfaces of the vanes as they are extended and/or retracted. In this fashion, the accumulation of biofouling is minimized, increasing efficiency and reducing maintenance frequency.

With reference to FIGS. 1, 2, and 3 the overall structure, which exhibits a positive buoyancy by virtue of a multitude of both hollow and structural foam-filled cavities, is held in a state of tension to the floor or bottom of a body of water by a plurality of tethers 38. At the upper terminus of each tether is located a dynamically-adjustable winch drum 39. The winch drum allows adaptation to changes in ocean water level, and also serves to vary the degree of submergence of the wave energy converters, thereby accommodating the variable amplitude of different wave conditions. Each winch drum assembly 39 can be equipped with a high torque slip feature to ensure that the local forces do not exceed the structure's yield strength. Optionally, the marine hybrid energy device may be adaptable for submersion entirely or substantially entirely beneath the surface of the body of water, such as, for example, when severe storms or hurricanes or the like are approaching. Thus, the device may be submerged to limit its exposure to the severe conditions at the surface of the body of water. Optionally, for example, the winch drums 39 may be actuated to refract the cables or tethers to draw the support structure downward toward the floor or bottom of the body of water. Such actuation may be accomplished via a control or communication from a remote location such that an operator may cause the device to be submerged without having to actually visit the site.

Figure 5:
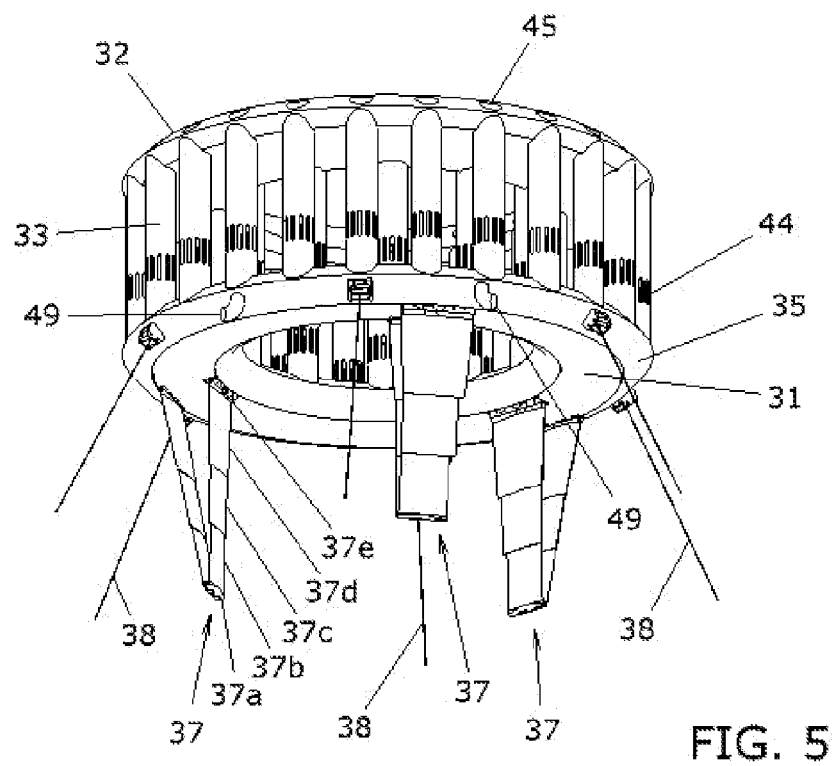
FIG. 5 is a perspective view of the marine energy hybrid of the present invention configured to capture wave and ocean current energy only.

FIG. 5 depicts a plurality of "steerable thrusters" 49, that would serve to reinforce the mooring arrangement in resisting the substantial side-loading encountered during severe weather conditions. These thrusters, if powered by the wind, wave, or ocean current inputs of the present invention may also provide a zero emissions source of motive force during transportation of the plant to the site and its subsequent installation.

A multitude of alternate tether configurations are possible, dependant upon the characteristics of the specific site of deployment. In regions with strong ocean current flow combined with a relatively shallow continental shelf floor (the Gulf Stream off the Eastern Seaboard of the United States, for example), a plurality of tethers 38 radiating away from the central axis is most preferable, as depicted in FIG. 1. However, in regions with low ocean current flow, and a steeply sloping shelf floor (the Eastern Pacific Ocean off the Western Seaboard of the United States, for example), a more appropriate mooring configuration would comprise a plurality of tethers emanating from the inner circumference of the structure towards the central axis, converging into a single tether or torsion-resistant tether assembly which is in turn connected to the seabed, as depicted in FIG. 16. In such an application, it is preferable that there exists an arrangement of contra-rotating carriages such that the torque of each carriage is counteracted by that of the other, the consequence of which being that the central ring or support structure remains substantially non-rotatable or substantially stationary during operation of the device.

If there is insufficient current flow velocity at the site of deployment to justify the water-propelled vane assemblies 37, and their carriage 36, then an alternative embodiment of the present invention, such as depicted in FIG. 4, without a water current element should be implemented. The device shown in FIG. 4 may be otherwise similar to the energy device 20, discussed above, such that a detailed discussion of the energy devices need not be repeated herein.

In another embodiment, and such as illustrated in FIG. 5, the present invention may be configured to capture wave and ocean current energy only, by omission of the wind-propelled carriage 31. The device shown in FIG. 5 may be otherwise similar to the energy device 20, discussed above, such that a detailed discussion of the energy devices need not be repeated herein.

In yet another embodiment featured in FIG. 6, the present invention may be configured to capture wind and ocean current only, by omission of the wave energy conversion element. Also indicated is a possible means of locating an energy transfer cable 47, and/or pipeline 48 between the device and the floor or bottom of the body of water and on to its destination. Such a means for energy transfer allows for the length of the tethers to be adjusted unimpeded, whilst minimizing induced turbulence by conjoining the profile of said cable and/or pipeline with the profile of said tethers. The device shown in FIG. 6 may be otherwise similar to the energy device 20, discussed above, such that a detailed discussion of the energy devices need not be repeated herein.

In an alternate embodiment as shown in FIG. 7, a marine energy device of the present invention may include an externally mounted float type wave energy converter mechanism 40. In operation, the float-type WEC 40 generates electrical or mechanical output by virtue of the relative motion between the float elements 40, and the stationary column 33. Additionally, any of a multitude of "point source" types of wave energy converter, or any combination thereof may be supported by, or housed within each column 33. Alternatively, any attenuator-type WEC may be integrated within the primary structure, and still be within the spirit and scope of the present invention. Furthermore, any combination of point source and attenuator-type WECs may be specified.

Figure 10:
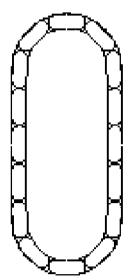
FIG. 10 is a plan view of the present invention wherein the track is an oval.
Figure 11:
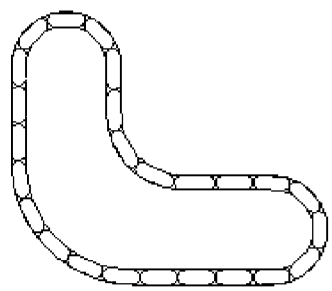
FIG. 11 is a plan view of the present invention wherein the track is an irregular shape.

Optionally, the overall shape of the non-rotatable structure of the energy device may be any suitable shape or configuration, such as a generally circular ring (as shown in FIGS. 1-9, or other suitable shape, while remaining within the spirit and scope of the present invention. For example, and as can be seen with reference to FIGS. 10 and 11, the overall shape of the non-rotatable structure may be non-circular, such as oval shaped (FIG. 10) or other configuration, such as generally L-shaped (FIG. 11) or any other suitable shape or configuration. In order to accommodate themselves to the track, the movable carriages may be segmented and/or articulated and/or flexible to allow for negotiation along the non-circular path or track. The movable carriages thus move along the continuous or closed-loop tracks in any suitable shape or configuration. The vane or vanes may be mounted to the carriage and spaced apart along the carriage and/or may be mounted to spaced apart carriage sections or segments (such as at a particular separation distance or spacing along the carriage segments).

The term "rotate" as used herein to describe the movement of the carriages about or along or around the frocks of the support structure is not meant to be limited to circular movement of the carriages about a circular support structure, but is intended to encompass any movement of the carriages along the tracks of a support structure of any closed-loop or continuous form, whereby any particular vane on the carriage will "rotate" or move about the substantially continuous path or loop and about a generally central axis of the closed-loop or continuous support structure regardless of the actual shape of the support structure. The carriage may comprise a continuous circular-shaped carriage for movement around a circular-shaped track or support structure, or the carriage or carriages may comprise jointed or segmented carriage sections or flexible carriages to allow for varying degrees of bending or flexing of the carriage or carriages as they negotiate the curves of and around the track of the support structure.

Figure 12:
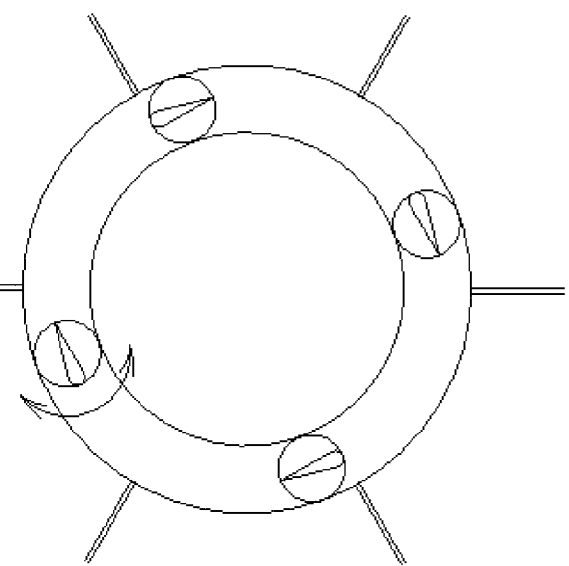
FIG. 12 is a plan view of the present invention illustrating the ability of the vane assemblies to rotate about a vertical axis in order to optimize their angle of attack.

Optionally, in another embodiment, such as illustrated in FIG. 12, the wind-propelled vanes or the wafer-propelled vanes, or both, of the energy device of the present invention may be rotatable around their respective vertical axes in order to continuously optimize their angle of attack. Thus, as the upper and/or lower carriages are rotated or moved about the central axis of rotation of the device, the respective vanes may rotate about their respective axes of rotation to adjust the angle of the vanes relative to the wind direction.

Figure 13:
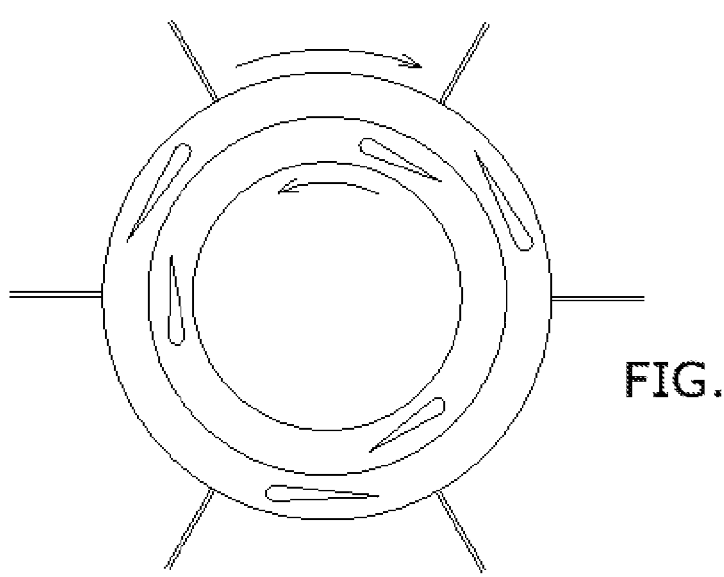
FIG. 13 is a plan view of an alternate embodiment of the present invention wherein two there exist two concentric, contra-rotating vane-propelled carriages.

FIG. 13 represents an alternate embodiment wherein there exist two concentric, contra-rotating wind, and/or two concentric, contra-rotating ocean current-propelled carriages. Thus, the two wind propelled carriages may rotate or move in opposite directions about or along two upper tracks of the support structure to counter-balance the torques applied by the carriages as they are moved along the upper tracks of the support structure. Likewise, two water current propelled carriages may rotate or move in opposite directions along two lower tracks of the support structure. It should be noted that there may exist more than two concentric wind and/or more than two concentric ocean current-propelled carriages.

FIG. 14 depicts an alternative embodiment wherein the wind or ocean current-propelled vanes, or both, share a common rotating carriage, and are conjoined at a common central apex. Thus, a plurality of vanes 53 may be spaced apart along the upper or lower carriage and angled upward/downward and radially inward so as to intersect and be joined at their distal end regions. Such a configuration provides enhanced structural rigidity to the vanes to limit flexing or bending of the vanes during use.

A further embodiment is depicted by FIG. 15, wherein the indicated area 51 circumscribed by the primary structure is occupied by wave energy converters. Alternately, or additionally, the indicated area 50 that extends beyond the periphery of the primary structure may be occupied by WECs. Furthermore, the WECs occupying the indicated area 50 may serve as a protective perimeter boundary, particularly if they are comprised of a soft, possibly pneumatic device.

It should be noted that the wind and water vane assemblies 30, and 37 featured throughout the present description may be replaced by any of a multitude of aerodynamic and hydrodynamic thrust-generating devices while remaining within the spirit and scope of the present invention. These include, but are not limited to non-rigid or semi-rigid sails, telescoping single-element (monoplane) airfoils and hydrofoils, non-telescoping monoplane airfoils and hydrofoils, non-telescoping multi-element (biplane, triplane, etc.) airfoils and hydrofoils, and Magnus-effect "Flettner" type rotors. The variable-geometry and variable degree of extension functionality achieved by the telescoping vane assemblies 30 and 37 may be accomplished by various alternate or complimentary means. These include furling in the case of sails, tilting, and the integration of rudder elements and/or the like.

Furthermore, and such as depicted in FIG. 17, the substantial interior volume of the upper rigid structural member 32 may be exploited for the installation of a multitude of utilities relating to various primary or secondary functions. These include, but are not limited to, desalinization, hydrogen production, geothermal wellhead facilities, flywheel energy storage, utility-scale battery storage, compressed air energy storage, maintenance personnel overnight living quarters, ocean thermal energy conversion (OTEC) facilities, salinity gradient conversion facilities, and/or the like. Most preferably, these utilities may be housed in one or more continuous cavities 55, 56, 57, 58, 59, integral with the surrounding structure, thereby contributing to overall structural rigidity.

Optionally, and such as shown in FIG. 18, the substantial surface areas 61, 62, and 63 of the various above-water elements of the structure (such as of the wind and/or the upper surface/surfaces of the rotatable ring and/or fixed ring) may be exploited for the installation of either thermal or photoelectric solar conversion devices.

Optionally, and as shown in FIG. 19, auxiliary turbines 65 and 66 may be mounted to the stationary structure. These turbines may be above and/or below the water line intercepting either the wind or ocean current stream, or both. For example, auxiliary turbines 65 may be mounted at the upper track and/or upper fixed member for intercepting the wind stream, while the auxiliary turbines 66 may be mounted at the lower track and/or lower fixed member for intercepting the water current.

While certain features and embodiments of the present invention have been described in detail herein, it will be readily understood that the present invention encompasses any and all modifications and enhancements within the spirit and scope of the present invention, and is intended to be limited only by the scope of the appended claims as interpreted according to the principles of patent law including the doctrine of equivalents.

What is claimed is:

1. A marine energy hybrid comprising:
   a support structure locatable at or near the surface of a body of water, wherein said support structure comprises a closed-loop hubless support structure, said support structure having an upper track established at an upper region thereof and a lower track established at a lower region thereof;
   an upper carriage movable along said upper track of said support structure and about a generally vertical axis;
   at least one upper vane mounted at said upper carriage, wherein said at least one upper vane is configured to induce motion of said upper carriage relative to said upper track of said support structure by reaction with wind;
   wherein said marine energy hybrid is operable to convert the motion of said upper carriage relative to said upper track of said support structure into usable energy;
   a lower carriage movable along said lower track of said support structure and movable about said generally vertical axis;
   at least one lower vane mounted at said lower carriage, wherein said at least one lower vane is configured to induce motion of said lower carriage relative to said lower track of said support structure by reaction with water current; and
   wherein said marine energy hybrid is operable to convert the motion of said lower carriage relative to said lower track of said support structure into usable energy.

2. The marine energy hybrid of claim 1, comprising at least one wave energy conversion device operable to convert wave motion at said marine energy hybrid into usable energy.

3. The marine energy hybrid of claim 2, wherein said at least one wave energy conversion device comprises a plurality of columns disposed generally between said upper and lower tracks, and wherein said at least one wave energy conversion device is operable to generate usable energy responsive to flow of water into and out from said columns.

4. The marine energy hybrid of claim 3, wherein a turbine is disposed in each of said columns and wherein wave motion induces motion of said turbine, and wherein said at least one wave energy conversion device is operable to convert motion of said turbine into usable energy.

5. The marine energy hybrid of claim 1, wherein at least one of said upper and lower vanes comprises at least one triangulated vane, and wherein each triangulated vane comprises a triangulated arrangement of two or more individual vanes with spaced apart bases at said support structure and conjoined distal end regions.

6. The marine energy hybrid of claim 5, wherein said spaced apart bases comprise an outer base at an outboard region of the respective upper or lower carriage and an inner base at an inboard region of the respective upper or lower carriage.

7. The marine energy hybrid of claim 6, wherein said at least one triangulated vane comprises a telescoping plurality of sections, and wherein said bases are hingedly mounted at said inboard and outboard regions of the respective upper or lower carriage and said distal end regions are hingedly conjoined, and wherein said vanes are extendable and retractable to adjust a degree of extension of said vanes from said support structure.

8. The marine energy hybrid of claim 1, wherein said upper carriage is urged away from said upper track via magnetic forces to reduce friction between said upper carriage and said upper track.

9. The marine energy hybrid of claim 1, comprising at least one of (i) multiple counter-rotating lower carriages each having at least one respective lower vane, wherein said lower carriages are movable in opposite directions along respective lower tracks of said support structure, (ii) multiple counter-rotating upper carriages each having at least one respective upper vane, wherein said upper carriages are movable in opposite directions along respective upper tracks of said support structure.

10. The marine energy hybrid of claim 1, wherein at least one of (i) said lower vane is rotatable about a vertical axis relative to said lower carriage, and (ii) said upper vane is rotatable about a vertical axis relative to said upper carriage.

11. A marine energy hybrid comprising:
   a support structure locatable at or near the surface of a body of water, wherein said support structure comprises a closed-loop hubless support structure, said support structure having an upper portion and a lower portion;

a wave energy conversion device at said support structure and operable to generate energy in response to wave motion of the body of water, wherein said at least one wave energy conversion device comprises a plurality of columns disposed generally between said upper and lower portions of said support structure, and wherein said at least one wave energy conversion device is operable to generate usable energy responsive to flow of water at said columns; and at least one of (a) an upper carriage movable along said upper portion of said support structure and about a generally vertical axis, wherein at least one upper vane is mounted at said upper carriage and is configured to induce motion of said upper carriage relative to said upper portion of said support structure by reaction with wind, and wherein said marine energy hybrid is operable to convert the motion of said upper carriage relative to said upper portion of said support structure into usable energy, and (b) a lower carriage movable along said lower portion of said support structure and movable about a generally vertical axis, wherein at least one lower vane is mounted at said lower carriage and is configured to induce motion of said lower carriage relative to said lower portion of said support structure by reaction with wafer current, and wherein said marine energy hybrid is operable to convert the motion of said lower carriage relative to said lower portion of said support structure into usable energy.

12. The marine energy hybrid of claim 11, wherein a turbine is disposed in each of said columns and wherein wave motion induces motion of said turbine, and wherein said at least one wave energy conversion device is operable to convert motion of said turbine into usable energy.

13. The marine energy hybrid of claim 12, wherein each of said columns comprises a generally hollow column having (i) a water port established between said upper and lower portions of said support structure, and (ii) an upper vent at or near said upper portion of said support structure, and wherein said water port is located below the waterline when said marine energy hybrid is in use.

14. The marine energy hybrid of claim 13, wherein, when a wave is intercepted by one of said columns, wafer is forced under pressure through said water port and the water level within said column rises, causing a compression of the air within said column, and wherein, as the contained air is compressed, the air is forced towards said upper vent, thereby inducing rotational movement of said turbine, and wherein, when the wave recedes at said one of said columns, the water flows out of said column through said water port, causing air to flow through said upper vent and into said column, and wherein, as the air is drawn into said column, the air induces rotational movement of said turbine.

15. The marine energy hybrid of claim 14, wherein said turbine comprises a uni-directional Darrieus-type turbine.

16. The marine energy hybrid of claim 11, comprising an upper carriage movable along said upper portion of said support structure and about a generally vertical axis, wherein at least one upper vane is mounted at said upper carriage and is configured to induce motion of said upper carriage relative to said upper portion of said support structure by reaction with wind, and wherein said marine energy hybrid is operable to convert the motion of said upper carriage relative to said upper portion of said support structure into usable energy.

17. The marine energy hybrid of claim 16, wherein said upper vane comprises a triangulated vane, and wherein said triangulated vane comprises a triangulated arrangement of two or more individual vanes with spaced apart bases at said support structure and conjoined distal end regions.

18. The marine energy hybrid of claim 17, wherein said individual vanes are extendable and retractable to adjust a degree of extension of said upper triangulated vane from said support structure.

19. The marine energy hybrid of claim 11, comprising a lower carriage movable along said lower portion of said support structure and movable about a generally vertical axis, wherein at least one lower vane is mounted at said lower carriage and is configured to induce motion of said lower carriage relative to said lower portion of said support structure by reaction with water current, and wherein said marine energy hybrid is operable to convert the motion of said lower carriage relative to said lower portion of said support structure into usable energy.

20. The marine energy hybrid of claim 19, wherein said lower vane comprises a triangulated vane, and wherein said triangulated vane comprises a triangulated arrangement of two or more individual vanes having separated bases at said support structure and conjoined distal end regions.

21. The marine energy hybrid of claim 20, wherein said individual vanes are extendable and retractable to adjust a degree of extension of said lower triangulated vane from said support structure.

22. A marine energy hybrid comprising:
 a support structure locatable at or near the surface of a body of water, wherein said support structure comprises a closed-loop hubless support structure, said support structure having an upper portion and a lower portion;
 at least one vane disposed at a carriage that is movable relative to said support structure;
 wherein said carriage comprises one of (a) an upper carriage movable along said upper portion of said support structure and about a generally vertical axis, wherein said vane is mounted at said upper carriage and is configured to induce motion of said upper carriage relative to said upper portion of said support structure by reaction with wind, and wherein said marine energy hybrid is operable to convert the motion of said upper carriage relative to said upper portion of said support structure into usable energy, and (b) a lower carriage movable along said lower portion of said support structure and movable about a generally vertical axis, wherein said vane is mounted at said lower carriage and is configured to induce motion of said lower carriage relative to said lower portion of said support structure by reaction with wafer current, and wherein said marine energy hybrid is operable to convert the motion of said lower carriage relative to said lower portion of said support structure into usable energy;
 wherein said vane comprises a triangulated vane comprising a triangulated arrangement of at least two individual vanes, said at least two individual vanes having (i) spaced apart bases hingedly mounted at said support structure and (ii) hingedly conjoined distal end regions; and
 wherein said individual vanes are extendable and retractable to adjust a degree of extension of said triangulated vane from said support structure.

23. The marine energy hybrid of claim 22, wherein each of said at least two individual vanes of said triangulated vane comprises a telescoping plurality of sections that are telescopingly extendable and retractable to adjust the degree of extension of said triangulated vane from said support structure.

24. The marine energy hybrid of claim 22, wherein said at least one vane comprises a plurality of triangulated vanes disposed along said carriage.

25. The marine energy hybrid of claim 22, wherein said spaced apart bases comprise an outer base at an outboard region of said carriage and an inner base at an inboard region of said carriage.

26. The marine energy hybrid of claim 22, wherein said vane comprises an upper vane and wherein said carriage comprises an upper carriage movable along said upper portion of said support structure and about a generally vertical axis, wherein said vane is mounted at said upper carriage and is configured to induce motion of said upper carriage relative to said upper portion of said support structure by reaction with wind, and wherein said marine energy hybrid is operable to convert the motion of said upper carriage relative to said upper portion of said support structure into usable energy.

27. The marine energy hybrid of claim 22, wherein said vane comprises a lower vane and wherein said carriage comprises a lower carriage movable along said lower portion of said support structure and movable about a generally vertical axis, wherein said vane is mounted at said lower carriage and is configured to induce motion of said lower carriage relative to said lower portion of said support structure by reaction with water current, and wherein said marine energy hybrid is operable to convert the motion of said lower carriage relative to said lower portion of said support structure into usable energy.

* * * * *

UNITED STATES PATENT AND TRADEMARK OFFICE
CERTIFICATE OF CORRECTION

PATENT NO.         : 8,362,631 B2
APPLICATION NO.    : 13/465483
DATED              : January 29, 2013
INVENTOR(S)        : Justin C. Roe et al.

It is certified that error appears in the above-identified patent and that said Letters Patent is hereby corrected as shown below:

Column 2
Line 54, delete "," after "farm"

Column 3
Line 14, "wafer" should be -- water --

Column 4
Line 27, "diversify" should be -- diversity --

Column 5
Line 53, "infernal" should be -- internal --

Column 7
Line 28, "wafer" should be -- water --

Column 8
Line 14, "wafer" should be -- water --

Column 9
Line 58, "refracted" should be -- retracted --

Column 10
Line 9, "wafer" should be -- water --
Line 21, "If" should be -- it --
Line 49, "refract" should be -- retract --

Column 11
Line 37, "wafer" should be -- water --

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,362,631 B2

Column 12
Line 11, "frocks" should be -- tracks --
Line 28, "wafer" should be -- water --

Column 15
Line 25, Claim 11, "wafer" should be -- water --
Line 42, Claim 14, "wafer" should be -- water --

Column 16
Line 48, Claim 22, "wafer" should be -- water --